Figure 1:
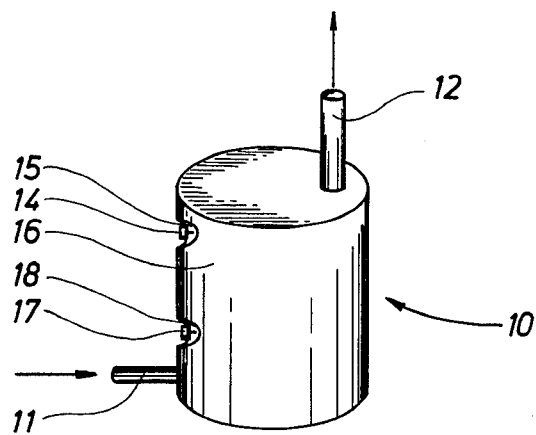

United States Patent [19]
Jensen

[11] Patent Number: 4,484,862
[45] Date of Patent: Nov. 27, 1984

[54] SUBMERSIBLE PUMPS

[75] Inventor: Børge R. Jensen, Brussels, Belgium

[73] Assignee: Grundfos A/S, Bjerringbro, Denmark

[21] Appl. No.: 362,650

[22] Filed: Mar. 29, 1982

[30] Foreign Application Priority Data

Apr. 9, 1981 [GB] United Kingdom ............... 8111180

[51] Int. Cl.³ ................... F04B 49/02; F04B 49/06
[52] U.S. Cl. .................................... 417/36; 417/44
[58] Field of Search ............... 417/25, 36, 38, 40; 137/392; 73/290 V; 310/324, 338; 340/621

[56] References Cited

U.S. PATENT DOCUMENTS

| | | | |
|---|---|---|---|
| 1,913,557 | 6/1933 | Millar | 417/25 |
| 2,975,347 | 3/1961 | Schaeffer | 417/36 |
| 2,990,543 | 6/1961 | Rod | 340/621 |
| 2,995,347 | 8/1961 | Rich | 310/324 |
| 3,825,025 | 7/1974 | Samuel | 137/392 |
| 3,829,241 | 8/1974 | Emeny | 417/25 |
| 3,889,523 | 6/1975 | Nolte | 73/290 V |
| 4,019,072 | 4/1977 | Mifune | 310/338 |
| 4,176,524 | 12/1979 | Kamiyama | 310/324 |
| 4,182,363 | 1/1980 | Fuller | 137/392 |
| 4,193,010 | 3/1980 | Kompanek | 310/324 |

Primary Examiner—William L. Freeh
Attorney, Agent, or Firm—Michael N. Meller

[57] ABSTRACT

An apparatus for controlling the operation of a pump, especially a submersible pump, and particularly for controlling a water level in connection with cellar drainage pumps, comprises at least one level detector using the principle of acoustic impedance for detecting the presence or absence of liquid to be pumped, said level detector being electrically connected to a control circuit controlling a switching device for the pump.

1 Claim, 4 Drawing Figures

SUBMERSIBLE PUMPS

The present invention relates to an apparatus for controlling the operation of a pump, especially a submersible pump, and particularly controlling a water level in connection with cellar drainage pumps or pumps in water towers, borings, and wells.

Submersible pumps are known and have a number of uses, e.g., pumping water from the cellars of buildings or the sump of a building site. The pumps are usually automatically or semi-automatically controlled to switch on and off in response to the level of the water and the usual level detector is a mechanical float valve. However, the float valves have been found in practice to be a continual source of trouble due to their having to work in water which is dirty. Further, the float valves are relatively bulky and can be obstructed if the pump is placed close to a wall or other large obstructions.

It is an object of the present invention to provide an improved level detector for use with a submersible pump.

The present invention provides a level detector using the principle of acoustic impedance for detecting the presence or absence of liquid to be pumped.

Preferably, each pump is provided with two-level detectors placed one above the other, the upper one being used to switch on the pump when the liquid level rises above the upper detector and the lower one to switch it off when the liquid level drops below the lower detector.

Advantageously, the or each level detector comprises a piezo-electric transducer arranged to measure the acoustic impedance of the transducer itself. Such a detector is compact, is insensitive to deposits or lumps of particles or the like in the liquid being pumped and has no mechanical moving parts. Consequently, it is reliable, able to withstand rough handling, compact and does not noticeably extend the envelope of the pump.

Figure 2:
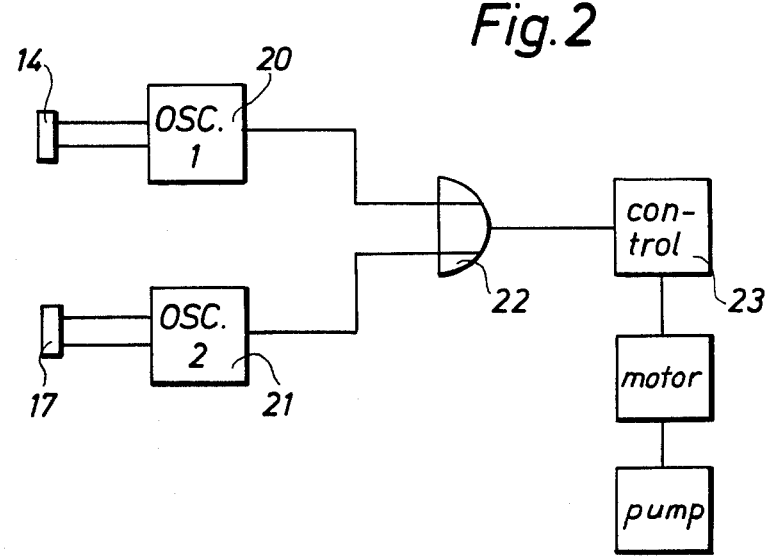
Figure 3:
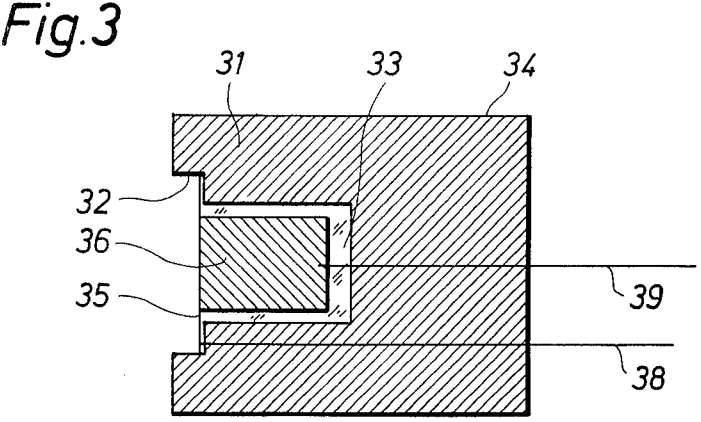
Figure 4:
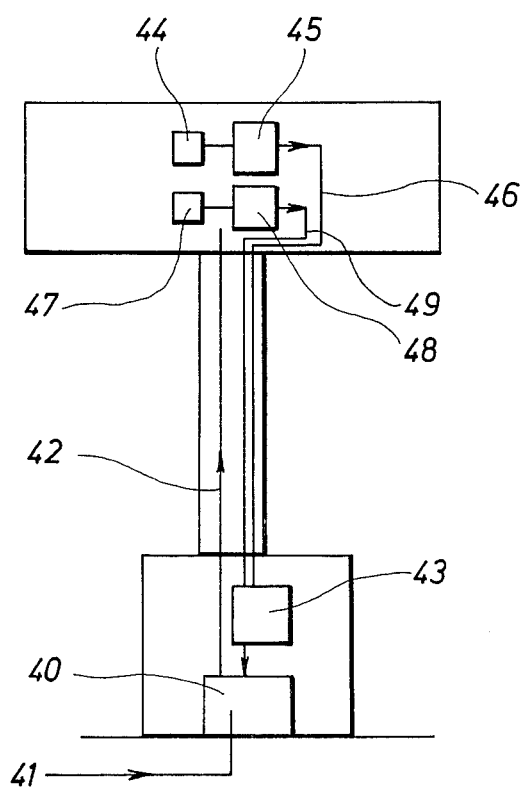

In order that the present invention be more readily understood, an embodiment thereof will now be described by way of example with reference to the accompanying drawings, in which FIG. 1 is a diagrammatic view of a submersible pump provided with level detectors according to the present invention, FIG. 2 shows a block diagram of a control circuit for the pump of FIG. 1, FIG. 3 shows a cross-sectional view of an embodiment of a level detector according to the invention, and FIG. 4 shows a water tower with a water pump and a level detector according to the invention.

A submersible pump 10 has a lower liquid inlet 11 and an upper liquid outlet 12. A first liquid level sensor 14 is received in a recess 15 in the outer casing 16 of the pump. If desired, a second liquid level sensor 17 is received in a further recess 18 in the pump casing disposed below the recess 15 so as to detect a different, lower liquid level. The pumping mechanism and the prime mover for operating the mechanism are conventional and will not be described further.

The sensors 14 and 17 are piezo-electric elements of some 5 mm diameter and their electrical characteristics are determined by the acoustic impedance of the medium in which the elements are submerged. Thus, the sensors 14 and 17 can be considered as resistive components whose resistance changes depending on whether they are in liquid or in gas. This change in resistance can be detected in any suitable manner but the preferred circuit is such as will now be described in relation to FIG. 2.

In FIG. 2, the sensor 14 forms part of a first oscillator circuit 20 while the sensor 17 forms part of a second oscillator circuit 21. As the acoustic impedance of the mode of the sensors changes from immersion in liquid to immersion in air, each oscillator can be made to oscillate or not so as to indicate the presence or absence of liquid at that sensor and hence the liquid level.

Only one sensor and oscillator circuit is really required, but by using two, more sophisticated control is possible. This sophisticated control is not shown in detail in FIG. 2 where the outputs from the oscillators 20 and 21 are simply fed through an OR gate 22 to a control circuit 23 which is used to control the prime mover of the pump. In this case, the sensor 17 could be considered as simply a safety device, and it could be deleted in this example.

FIG. 3 illustrates an embodiment of a level detector according to the invention. A plastic block 31, preferably a circular cylinder, comprises a recess 32 and a cylindrical bore 33 preferably concentrically located relative to the cylindrical surface 34 of the block. A thin foil or metal film 35, e.g. a copper or bronze foil, is mounted in the recess 32 and is preferably 40$\mu$ thick. A piezo-electric material member 36 is mounted on the back of this foil inside the bore 33 in the plastic block. This material member is preferably shaped as a circular cylinder of a diameter permitting a predetermined clearance between the plastic block and the piezo-electric material. This clearance need not, however, be as great as illustrated in the drawing. The piezo-electric material member may oscillate freely relative to the bottom of the bore in the plastic block and oscillate together with the foil 35 forming a membrane. The membrane 35 separates the liquid or the air from the interior of the detector. When a liquid, e.g. water, rises and covers the detector, the liquid is coupled closely by way of the membrane to the piezo-electric material and thereby damps, i.e. attenuates, the oscillations. As a result, a change in the electric properties of the material is provided. One end of the piezo-electric material is by means of the membrane 35 connected to a conductor 38, and the other end of said piezo-electric material is connected to a second conductor 39. These two conductors may be connected to an electric circuit detecting the change in the electric properties of the piezo-electric material. This circuit may be constructed in a manner known per se and is therefore not described in greater detail in the present application. It is to be noted that the pump and the motor may be mounted as shown for instance in Schaefer, U.S. Pat. No. 2,957,347.

The apparatus for controlling a pump may also be used in connection with the control of the water level in a water tower comprising a pump 40, an inlet pipe 41, and a delivery pipe 42 (see FIG. 4). Such an embodiment comprises preferably at least two level detectors 44, 47 connected to their respective electric circuit 45, 48 detecting the presence or absence of liquid. The upper detector circuit may be adapted to switch off the pump by means of an electric wire connection 46 to a switching on and off circuit 43 when the water level covers the upper detector. Correspondingly, the lower detector may by means of the electric circuit 48 and an electric connection 49 to the switching on and off circuit 43 start the pump when the water level has dropped below the lower level detector 47.

I claim:

1. Apparatus for controlling the operation of a cellar drainage pump, including
   (a) piezo-electric level detecting means which comprises a circular cylindrical plastic housing having a recess and a cavity, also of circularly cylindrical configuration, a membrane arranged in said recess to close said cavity, with a first face of said membrane serving to sense a fluid level and thereby derive an electrical signal, a piezo-electric body with such circularly cylindrical configuration mounted on said membrane with said piezo-electric body being mounted on a second face of said membrane inside said cavity and capable of translational oscillation along an axis lying substantially perpendicular to said membrane,
   (b) control circuitry means, including a first electrical conductor connected to said control circuitry means and to one end of said piezo-electric body, and a second electrical conductor connected to said control circuitry means and to the other end of said piezo-electric body by way of said membrane, and
   (c) switching means for said pump so as to enable said piezo-electric level detecting means to sense by acoustic impedance transitions, the presence or absence of liquid adjacent to said detecting means; said detecting means being electrically connected to said control circuitry means; said control circuitry means being electrically connected to said switching means for controlling said switching means, and said detecting means being mounted in a recess on the outer casing of said pump.

* * * * *